United States Patent [19]

Pedrotty

[11] 4,268,556

[45] May 19, 1981

[54] RIGID MAGNETIC RECORDING DISKS LUBRICATED WITH FLUORINATED TELECHELIC POLYETHER

[75] Inventor: Doulas G. Pedrotty, Baldwin, Wis.

[73] Assignee: Minnesota Mining and Manufacturing Company, St. Paul, Minn.

[21] Appl. No.: 100,700

[22] Filed: Dec. 18, 1979

Related U.S. Application Data

[63] Continuation-in-part of Ser. No. 1,446, Jan. 8, 1979, abandoned.

[51] Int. Cl.³ .............................................. G11B 5/82
[52] U.S. Cl. ................................. 428/65; 358/128.5; 360/135; 428/64; 428/422; 428/900; 428/695
[58] Field of Search ................... 428/422, 64, 65, 900; 360/134, 135; 358/128; 179/100.1 B; 252/54.6

[56] References Cited

U.S. PATENT DOCUMENTS

| | | | |
|---|---|---|---|
| 2,654,681 | 10/1953 | Lueck | 428/447 |
| 2,804,401 | 8/1957 | Cousino | 428/900 |
| 3,250,808 | 5/1966 | Moore | 562/586 |
| 3,490,946 | 1/1970 | Wolff | 428/900 |
| 3,668,658 | 6/1972 | Flores | 360/133 |
| 3,699,145 | 10/1972 | Sianesi | 562/586 |
| 3,778,308 | 12/1973 | Roller | 428/900 |
| 3,810,874 | 5/1974 | Mitsch | 528/44 |
| 3,919,719 | 11/1975 | Wright | 428/900 |
| 3,954,637 | 5/1976 | Pardee | 252/12 |
| 3,973,072 | 8/1976 | Anderson | 428/433 |
| 4,012,551 | 3/1977 | Bogaty | 428/422 |
| 4,085,137 | 4/1978 | Mitsch | 260/307 D |
| 4,096,079 | 6/1978 | Pardee | 428/64 |
| 4,097,388 | 6/1978 | Snyder | 252/49.9 |

*Primary Examiner*—Ellis P. Robinson

[57] ABSTRACT

Rigid magnetic recording disk is lubricated by a thin coating of a fluorinated telechelic polyether polymer having at least one polar group such as —CONHCH$_2$C-H$_2$OH, —COOCH$_3$, —CONHCH$_2$C$_6$H$_5$, and —COCF$_3$. The coating is surprisingly resistant to removal by commonly used cleaning agents.

8 Claims, No Drawings

RIGID MAGNETIC RECORDING DISKS LUBRICATED WITH FLUORINATED TELECHELIC POLYETHER

CROSS-REFERENCE TO RELATED APPLICATIONS

This application is a continuation-in-part of applicant's copending application Ser. No. 1,446, filed Jan. 8, 1979 now abandoned.

U.S. application Ser. No. 100,699, filed Dec. 18, 1979 (Chernega) claims a magnetic recording medium comprising a flexible backing and magnetizable layer coated with the same family of fluorinated polymer lubricants as those of the present invention.

FIELD OF THE INVENTION

This invention relates to the lubrication of rigid magnetic recording disks.

BACKGROUND OF THE INVENTION

Disk packs, each consisting of a stack of spaced-apart rigid magnetic recording disks, have long been in widespread use as memories for electronic computers. Users have become accustomed to cleaning the recording surfaces of the disks periodically with a cloth containing isopropyl alcohol. About five years ago, a new style of disk pack began to be marketed which is called a data module. In contrast to the earlier packs wherein the heads are normally out of contact with the disks, the heads of the data module are in contact with the disks until the disks approach operating speed. This contact requires that the disks be lubricated. It is believed that the most widely used lubricants for the disks are members of a class of highly fluorinated polyethers having the repeating unit

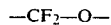

or

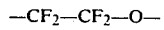

or

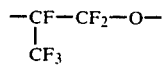

for example, polyethers such as

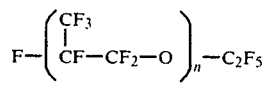

where n is an integer providing a Ferranti-Shirley viscosity (hereinafter measured at 1640 sec$^{-1}$) of about 75–1350 centipoises. Compare U.S. Pat. Nos. 3,778,308 (Roller) and 3,919,719 (Wright). Such polymers are available commercially from E. I. duPont de Nemours & Co. as "Krytox" 143 fluorinated oils. A preferred member of this class has been "Krytox" 143 AD which has a Ferranti-Shirley viscosity of 1322 centipoises and reportedly has a viscosity index (ASTM D2270) of 145 and an average molecular weight of about 7000. When these fluorinated polymers are used to lubricate rigid disks they tend to be removed if the disks are cleaned with isopropyl alcohol.

Some manufacturers of data modules buy prelubricated disks which may become contaminated during shipment and handling and hence need to be cleaned. If such cleaning were to remove the lubricant, the data modules would soon fail. The recording layers of the disks, which typically are thin coatings of fine magnetizable particles in a thermoset epoxy resin matrix, would prematurely wear away where contacted by the heads, and the matrix resin would gradually transfer to the heads to interfere with their flying capability.

The next generation of rigid disk equipment may employ heads which permanently remain in contact with the recording surface, in which case premature removal of the lubricant would be even more troublesome.

OTHER PRIOR ART

Highly fluorinated polyether prepolymers have been provided with polar groups which can react with other polyfunctional molecules to form polyurethanes, polyesters, polysiloxanes, polyamides or the like as disclosed in U.S. Pat. Nos. 3,810,874 and 4,085,137 (Mitsch et al.). The latter at column 11, lines 42-49 teaches that the same highly fluorinated prepolymers containing polar groups are also useful as lubricants, but without illustrating that use.

U.S. Pat. No. 4,097,388 (Snyder et al.) uses the same fluorinated prepolymers, except with different terminal polar groups, as lubricants for engine oils, hydraulic fluids, and greases.

THE PRESENT INVENTION

The present invention concerns one or a stack of spaced-apart rigid magnetic recording disks, the recording surfaces of which are lubricated by a very thin continuous coating which provides lubrication equal to that provided by the previously preferred "Krytox" 143 AD but is not removed by commonly used cleaning agents such as isopropyl alcohol. The lubricating coating is based on highly fluorinated polymers that are chemically similar to "Krytox" 143 AD but differ by containing highly polar groups. That lubricating coating comprises a fluorinated telechelic polyether polymer having a backbone comprising —C$_a$F$_{2a}$—O— units where a is an integer from 1 to 4, which backbone is terminated by at least one polar group such that $\mu^2$/MW is at least $19 \times 10^{-4}$ Debye$^2$-moles/g. "Telechelic" polymers have low molecular weight and known functional terminal groups.

The dipole moment $\mu$ of the fluorinated telomer or telechelic polymer can be calculated from the Onsager Relation $$\mu^2 = \frac{9k\,T\,MW\,(\epsilon_S - \epsilon_\infty)(2\epsilon_S + \epsilon_\infty)}{4\pi\,N_o\,d\,\epsilon_S(\epsilon_\infty + 2)^2}$$

where
k = Boltzmann's Constant
T = Temperature in °K.
MW = Molecular Weight
N$_o$ = Avogadro's Number
d = Density
$\epsilon_s$ = Dielectric constant measured at low frequencies,
$\epsilon_\infty$ = Dielectric constant measured at high frequencies, where the approximation is made through Maxwell's Relations that $$\epsilon_\infty = \eta_D^2 + (5-10\%)\eta_D^2 \cong 1.075\ \eta_D^2$$

where $\eta_D$ is the refractive index of the material at the sodium D line at 20° C.

The fluorinated telechelic polyether polymer preferably has a number average molecular weight of at least 1000 and a Ferranti-Shirley viscosity (measured at 1640 sec$^{-1}$ and 20° C.) of at least 20 centipoise. The number average molecular weight of fluorinated telechelic polyether polymers having more than one terminal polar group per polymer molecule is preferably somewhat higher as compared to telechelic polymers having only one terminal polar group. For example, where there are two terminal polar groups per polymer molecule, the number average molecular weight preferably exceeds 1500.

Useful polar groups for the fluorinated telechelic polyethers include

—CO$_2$R wherein R is alkyl of 1 to 6 carbon atoms, aryl or alkaryl of 6 to 10 carbon atoms;

wherein each of R' and R" is hydrogen, alkyl of 1 to 6 carbon atoms, benzyl, or —R" OH where R" is an alkylene group of 2 to 6 carbon atoms;

—C$_b$H$_{2b}$OH;

—C$_b$H$_{2b}$NR'R";

or

—C(OH)$_2$C$_b$F$_{2b+1}$ wherein b is an integer of 1 to 4.

Strongly acidic polar groups such as carboxylic or sulfonic acid groups are less desirable because they are potentially corrosive. This may be minimized by conversion to salts. Preferably the pKa of the telechelic polyether polymer is at least 1.0.

Preferred fluorinated telechelic polymers have the backbone —[CF$_2$CF$_2$O]$_m$—[CF$_2$O]$_n$—, where m is an integer from about 6 to 32 and n is an integer from about 12 to 52, as disclosed in U.S. Pat. Nos. 3,810,874 and 4,085,137, or the backbone —CF(CF$_3$)CF$_2$O—$_n$ or ￫CF$_2$CF(CF$_3$)O￩$_n$, where n is an integer from about 6 to 20, as disclosed in U.S. Pat. Nos. 3,250,808 and 3,699,145.

Such fluorinated telechelic polyethers are readily produced to have number average molecular weights within the preferred range of 1000–5000 and Ferranti-Shirley viscosities (measured at 1640$^{-1}$ sec) within the preferred range of 20–2000 centipose. The fluorinated telechelic polyether polymer may also contain —CF$_2$CF$_2$— units which increase the separation between the ether oxygens and tend to make it necessary to avoid number average molecular weights toward the high end of the preferred range of 1000–5000 mentioned above. Otherwise, the viscosity of the fluorinated telechelic polyether polymer might be too high to provide good lubrication.

Thin coatings of the fluorinated telechelic polyether polymers on rigid magnetic recording disks are highly resistant to removal by isopropyl alcohol, even to repeated vigorous scrubbing with saturated cloths. The lubricant may be applied from dilute solutions or dispersions by wiping or by any other technique such as spraying or dipping. After drying, the surface should be buffed with a dry, soft tissue to distribute the lubricant and remove any excess. The buffing changes the appearance from a slight haze to a shine. If a 5-$\mu$l drop of n-decane after 10 seconds has a diameter of about 3 mm, this indicates that a continuous coating has been applied. In the absence of any lubricant, the diameter of the drop may be about 10–12 mm.

Because it is not known how much of the lubricant has been removed by the buffing and because the coatings are thin, it is difficult to determine their thickness. Since a monomolecular layer of a fluorinated telechelic polyether polymer is believed to be on the order of 40 Angstroms in thickness, it is assumed that the coating should be at least that thickness. Electron scattering measurements suggest that thicknesses of 75 to 250 Angstroms should provide preferred results. It is believed that an unduly thick coating of a fluorinated telechelic polyether polymer can cause undue drag.

EXAMPLE 1

0.3 g of the highly fluorinated telechelic polymer polyether,

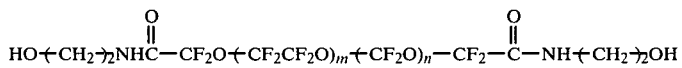

where m and n are each integers providing an average molecular weight of about 2000, was dissolved in 29.7 g of CClF$_2$CCl$_2$F ("Freon" 113). The Ferranti-Shirley viscosity of this polymer was 1440 cps. While a 14-inch (35-cm) rigid magnetic recording disk was being rotated at 3600 rpm, a soft tissue saturated with the solution was wiped across its recording surface several times. Then after two minutes during which the solvent volatilized, the surface was buffed with a dry soft tissue to distribute the lubricant and remove any excess.

The recording surface of the rigid disk comprised fine acicular magnetizable iron oxide particles in a thermoset epoxy resin binder, as did those of the disks of the examples below.

To identical disks were applied other highly fluorinated polymers containing at least one highly polar group. The backbone chains of these polymers are hereinafter referred to by the following abbreviations (the first of these having been used in Example 1):

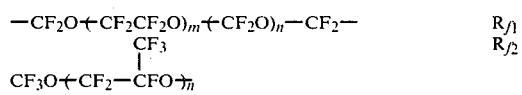

-continued

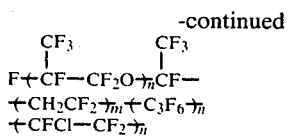

$R_{f3}$ $R_{f4}$
$R_{f5}$ where m and n are each integers. These lubricated disks were cleaned with isopropyl alcohol as follows:

With the disk spinning at 3600 rpm, a tissue soaked in isopropyl alcohol was pressed under full fingertip pressure against the disk for about 30 seconds while moving the tissue across the recording surface several times. Such cleaning removed the widely used "Krytox" 143 AD lubricant mentioned above, as indicated by surface tension tests. However, every fluorinated telechelic polyether polymer was resistant to such cleaning as indicated by surface tension tests using n-decane.

The effectiveness of the lubricating coatings of various fluorinated polymers was measured by the following tests.

Post-Cleaning Slide Test

After cleaning with isopropyl alcohol as indicated above, the disk is rotated at 120 rpm on a data module spindle, a speed at which an IBM 3348-type recording head remains in contact with the recording surface. After 24 hours at ordinary room temperature, the disk and head are then examined with the naked eye, and failure is indicated if either there is a burnished mark on the recording surface or the head has accumulated a visible residue.

Post-Cleaning Sliding Friction Test

During the Post-Cleaning Slide Test, the friction between the head and the recording surface is monitored periodically, and failure is indicated if more than 4.5 grams of frictional force is applied against the head, either continuously or intermittently at any time during the 24-hour period.

If in this test a value of more than 4.5 grams is observed initially, this may indicate that the coating of lubricant is too heavy, in which event the coating thickness may be reduced to an acceptable level by buffing with a dry soft tissue.

| | | | TEST RESULTS | | |
|---|---|---|---|---|---|
| Example | Lubricant | No. Ave. M/W | Viscosity in cps. (Ferranti-Shirley) | Post-Cleaning Slide Test | Post-Cleaning Sliding Friction Test |
| 1 | $R_{f1}$+CNH—CH$_2$—CH$_2$OH)$_2$ (with O=) | 2000 | 1440 | passed | passed |
| 2 | $R_{f1}$+CO$_2$CH$_3$)$_2$ | 2000 | 35 | passed | passed |
| 3 | $R_{f1}$+CH$_2$OH)$_2$ | 4000 | 195 | passed | failed |
| 4 | $R_{f1}$+CN+CH$_2$CH$_2$OH)$_2$]$_2$ (with O=) | 2100 | 730 | passed | passed |
| 5 | $R_{f1}$+CNH—CH$_2$—C$_6$H$_5$)$_2$ (with O=) | 2000 | 275 | passed | passed |
| 6 | $R_{f1}$+CH$_2$—NH$_2$)$_2$ | 800 | 30 | passed | failed |
| 7 | $R_{f1}$+COOH)$_2$ | 2000 | 71 | passed | passed |
| 8 | $R_{f2}$—CF$_2$—C—CF$_3$ (with O=) | 2600 | 125 | passed | passed |
| 9 | $R_{f3}$—COOH | 3200 | 1130 | passed | failed |
| 10 | $R_{f3}$—CO$_2$CH$_3$ | 3200 | 345 | passed | passed |
| 11 | $R_{f3}$—CNH—CH$_2$—CH$_2$OH (with O=) | 3300 | 1785 | passed | failed |
| 12 | $R_{f3}$—CN+CH$_2$—CH$_2$OH)$_2$ (with O=) | 3300 | 2100 | passed | failed |
| 13 | $R_{f4}$+COOH)$_2$ | 3800 | * | failed | failed |
| 14 | $R_{f4}$+CH$_2$OH)$_2$ | 3600 | * | failed | failed |
| 15 | $R_{f4}$+CO$_2$CH$_3$)$_2$ | 3400 | * | failed | failed |
| 16 | $R_{f5}$+CFClCF$_3$)$_2$ | 540 | 50 | passed | failed |

*indicates too high to measure

The fluorinated polymers of Examples 1–12 had the following values ($\epsilon_s$ being measured at 100 Hz except Example 1 at 10,000 Hz and Example 11 at 1000 Hz):

| Example | m | n | d | $\epsilon_s$ | $\epsilon_\infty$ | $\mu^2$/MW $\times 10^4$ |
|---|---|---|---|---|---|---|
| 1 | 8 | 14 | 1.772 | 23.0 | 1.876 | 809 |
| 2 | 8 | 14 | 1.721 | 3.70 | 1.815 | 91.8 |
| 3 | 16 | 28 | 1.814 | 2.55 | 1.805 | 37.6 |
| 4 | 8 | 14 | NA | NA | NA | NA |
| 5 | 8 | 14 | NA | NA | NA | NA |
| 6 | 3 | 5 | NA | NA | NA | NA |
| 7 | 8 | 14 | NA | NA | NA | NA |
| 8 | — | 15 | 1.874 | 2.22 | 1.814 | 20.6 |
| 9 | — | 18 | 1.80 | 2.36 | 1.825 | 27.6 |
| 10 | — | 18 | 1.848 | 2.79 | 1.822 | 46.6 |
| 11 | — | 18 | 1.90 | 3.68 | 1.843 | 80.2 |
| 12 | — | 18 | NA | NA | NA | NA |

NA = not available

It is not known why the coatings of the fluorinated telechelic polyether polymers of Examples 3, 6, 9, 11 and 12 failed the Post-Cleaning Sliding Friction Test. It is believed that Example 6 failed because the number average molecular weight of the telechelic polymer was only 800. Subsequent experiments suggest that some of the coatings may have been too thin. It is believed that after moderate experimentation, each of those telechelic polymers could have provided coatings that would pass the Post-Cleaning Sliding Friction Test.

When Example 1 was repeated except that the magnetic recording disk had a binder-free recording surface of U.S. Pat. No. 3,973,072 (Anderson), both the Post- Cleaning Slide Test and the Post-Cleaning Sliding Friction Test were passed. Such a binder-free recording surface can be applied by electrodeposition, chemical reduction, electroless plating, vapor plating, evaporation or sputtering.

What is claimed is:

1. One or a stack of spaced-apart rigid magnetic recording disks, each recording surface of which is lubricated by a very thin coating of a fluorinated telechelic polyether polymer having a backbone comprising repeating —$C_aF_{2a}$—O— units wherein a is an integer from 1 to 4, which backbone is terminated by at least one polar group, the $\mu^2$/MW of the polymer being at least $19 \times 10^{-4}$ Debye$^2$-moles/g, which coating resists removal upon cleaning the recording surfaces with isopropyl alcohol.

2. One or a stack of rigid disks as defined in claim 1, wherein at least one polar end group is selected from

—$CO_2R$ wherein R is alkyl of 1 to 6 carbon atoms, aryl or alkaryl of 6 to 10 carbon atoms;

$$-\overset{O}{\underset{\|}{C}}N'R'R''$$

wherein each of R' and R" is hydrogen, alkyl of 1 to 6 carbon atoms, benzyl, or —R''' OH whee R''' is an alkylene group of 2 to 6 carbon atoms;

—$C_bH_{2b}OH$;

—$C_bH_{2b}NR'R''$;

$$-\overset{O}{\underset{\|}{C}}C_bF_{2b+1};$$

or

—$C(OH)_2C_bF_{2b+1}$ wherein b is an integer of 1 to 4.

3. One or a stack of rigid disks as defined in claim 2 wherein said telechelic polymer is selected from

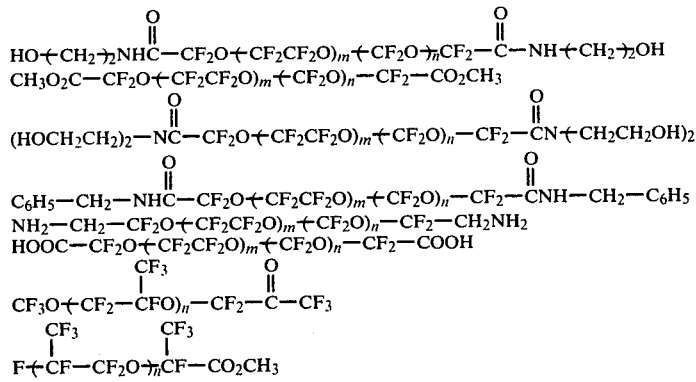

wherein m and n are each integers.

4. One or a stack of rigid disks as defined in claim 1 wherein the Ferranti-Shirley viscosity of the fluorinated telechelic polymer is at least 20 centipoises.

5. One or a stack of rigid disks as defined in claim 1, the recording surfaces of which comprise magnetizable particles in a nonmagnetic binder matrix.

6. One or a stack of rigid disks as defined in claim 1, the recording surfaces of which are binder-free.

7. One or a stack of rigid disks as defined in claim 3 wherein m and n are so selected that the Ferranti-Shirley viscosity of said polymer is 20–2000 centiposes.

8. One or a stack of rigid disks as defined in claim 2 wherein said polymer has a number average molecular weight of at least 1000 and a Ferranti-Shirley viscosity not exceeding 2000 centiposes.

* * * * *